United States Patent [19]
Kazmaier et al.

[11] Patent Number: 5,728,747
[45] Date of Patent: *Mar. 17, 1998

[54] STABLE FREE RADICAL POLYMERIZATION PROCESSES AND COMPOSITIONS THEREOF

[75] Inventors: Peter M. Kazmaier, Mississauga; Barkev Keoshkerian, Thornhill; Rafik O. Loutfy, Willowdale; Karen A. Moffat, Brantford; Michael K. Georges, Guelph; Gordon K. Hamer; Richard P. N. Veregin, both of Mississauga, all of Canada

[73] Assignee: Xerox Corporation, Stamford, Conn.

[*] Notice: The term of this patent shall not extend beyond the expiration date of Pat. No. 5,723,511.

[21] Appl. No.: 700,328

[22] Filed: Aug. 8, 1996

[51] Int. Cl.$^6$ .................... C08F 2/48; C08F 2/50; C08F 293/00

[52] U.S. Cl. .................... 522/11; 522/16; 522/24; 522/27; 522/28; 522/42; 522/63; 522/120; 522/125; 522/182; 522/188; 522/13; 522/113

[58] Field of Search .................... 522/182, 188, 522/16, 120, 125, 63, 11, 24, 27, 28, 42

[56] References Cited

U.S. PATENT DOCUMENTS

| | | | |
|---|---|---|---|
| 4,168,981 | 9/1979 | Donald et al. | 522/16 |
| 4,168,982 | 9/1979 | Pazos | 522/16 |
| 4,212,718 | 7/1980 | Pinazzi et al. | 522/182 |
| 4,581,429 | 4/1986 | Solomon et al. | 526/220 |
| 5,312,871 | 5/1994 | Mardare et al. | 525/272 |
| 5,322,912 | 6/1994 | Georges et al. | 526/204 |
| 5,331,018 | 7/1994 | McGinniss et al. | 522/182 |
| 5,401,804 | 3/1995 | Georges et al. | 525/267 |
| 5,552,502 | 9/1996 | Odell et al. | 526/234 |

FOREIGN PATENT DOCUMENTS

478838  3/1976  U.S.S.R. .

OTHER PUBLICATIONS

A.V. Trubnikov et al. "Effect of Stable Radicals on Styrene Polymerization", Saratov N.G. Chernyshersky State University, Jul. 2, 1974. (Submitted).
High–Molecular Compounds, vol. (A)XX, No. 11, 1978, A.V. Trubnikov et al., "Inhibition of Polymerization of Vinyl Monomers Using Nitride and Iminoxide Radicals".
M.D. Goldfein et al. "Inhibition of Styrene Polymerization by Stable Radical 4,4'–Diethoxydiphenylnitroxide," Saratov N.G. Chernyshevsky State University, submitted Jun. 27, 1972).
M.D. Goldfein et al. "Effect of Free Stable Radicals on the Kinetics and Mechanism of Polymerization of Certain Vinyl Monomers", Saratov N.G. Chernyshevsky State University, Submitted Jan. 1, 1974.
A.V. Trubnikov et al. "Mechanism of Inhibition of Polymerization of Vinyl Monomers by Stable Radicals", Saratov N.G. Chernyshevsky State University, Submitted Jul. 7, 1975.

*Primary Examiner*—Susan W. Berman
*Attorney, Agent, or Firm*—E. O. Palazzo

[57] ABSTRACT

A free radical polymerization process for the preparation of polymer comprising:
  a first heating and photoinitiating with ultraviolet light of a mixture comprised of a stable free radical agent, and at least one polymerizable monomer compound;
  optionally cooling said mixture;
  a second heating of said mixture at a temperature of from about 100° C. to about 160° C.;
  isolating the polymer product formed; and
  optionally washing and drying said polymer.

37 Claims, No Drawings

STABLE FREE RADICAL POLYMERIZATION PROCESSES AND COMPOSITIONS THEREOF

PENDING APPLICATIONS AND PATENTS

Illustrated in U.S. Pat. No. 5,412,047, the disclosure of which is totally incorporated herein by reference, is a polymerization process for the preparation of homopolymeric acrylates containing thermoplastic resin or resins comprising:

heating a mixture comprised of a free radical initiator, an oxo nitroxide stable free radical agent, at least one polymerizable acrylate monomer compound, and optionally, a solvent to form a homopolymeric acrylate-containing thermoplastic resin or resins with a high monomer to polymer conversion and a narrow polydispersity.

Illustrated in copending application U.S. Ser. No. 08/348,021, pending the disclosure of which is totally incorporated herein by reference, is a free radical polymerization process for the preparation of thermoplastic resin comprising:

heating a mixture of a free radical initiator, a stable free radical agent, and at least one polymerizable monomer compound, and wherein said heating is accomplished at a temperature of from about 40° to about 100° C. in the presence of ultrasonic irradiation;

cooling said mixture; and optionally isolating said thermoplastic resin, and washing and drying said thermoplastic resin.

Also mentioned are commonly owned and assigned copending applications U.S. Ser. No. 08/363,083, now U.S. Pat. No. 5,549,998, division of U.S. Ser. No. 08/181,134, now U.S. Pat. No. 5,401,804; U.S. Ser. No. 08/214,518, pending continuation-in-part of U.S. Ser. No. 07/976,604, now U.S. Pat. No. 5,322,912; and U.S. Ser. No. 08/223,418, pending the disclosures of each of which are totally incorporated herein by reference.

BACKGROUND OF THE INVENTION

The present invention relates to processes for the preparation of polymers, including homopolymers, random copolymers, block copolymers, functionally activated polymers, and the like, and, more specifically, to a polymerization process and to the polymers formed thereby, and especially to processes for the preparation of polymers, such as styrene polymers, copolymers, multiblock copolymers like copolymers of styrene/acrylates, styrene/methacrylates, and the like and which polymers possess in embodiments excellent polydispersities, such as less than 1.8. In embodiments, the present invention relates to a stable free radical moderated process for generating a thermoplastic polymer resin or resins that have narrow polydispersities, that is narrow molecular weight distributions as indicated by the ratio $M_w/M_n$, where $M_w$ is the weight average molecular weight and $M_n$ is the number average molecular weight, and easily controllable modality, from at least one monomer compound, comprising a photoinitiation, which photoinitiation is preferably accomplished with UV light, living free radical polymerization, and more specifically, heating for an effective period of time a mixture of a stable free radical agent and at least one polymerizable monomer compound in the presence of light, such as UV light under conditions such that all polymer chain formations are initiated at about the same time; cooling the mixture to effectively terminate the polymerization; isolating the thermoplastic resin product; and optionally washing and drying the polymer resin product. With the processes of the present invention in embodiments, the photoinitiation temperature can be low, for example from about a minus (−) 40° C. to about 100° C., or from about 20° C. to 60° C., and in embodiments preferably at about room temperature, for example about 25° C. The polymer resins generated by the process of the present invention in embodiments are essentially monomodal, and, in embodiments by repeating the heating and photoinitiation steps, there is provided a method for obtaining mixtures of monomodal polymer resins that are compositionally the same resin type having characteristics of both narrow polydispersity and known or selectable modality. In embodiments, the process of the present invention provides a method for conducting bulk or neat free radical polymerization processes on multikilogram or larger scales. The aforementioned embodiments may be accomplished in a one or single pot reactor environment. Further, in embodiments polymeric chain growth proceeds by a pseudoliving mechanism and can provide thermoplastic resins of variable molecular weights of from very low to very high, for example less than about 2,000 up to about 300,000 or greater, while maintaining narrow molecular weight distributions or polydispersities of, for example, about 1.05 to about 1.95 or less than 1.8 in embodiments, and wherein the monomer to polymer conversion is high, for example at least about 50 percent, and more specifically, from about 50 to about 99 to 100 percent. Moreover, in embodiments block copolymers can be synthesized by the aforementioned stable free radical moderated free radical polymerization processes, wherein each block formed is, for example, well defined in length by the reacted monomer, and wherein each block formed possesses a narrow molecular weight distribution, and wherein the block copolymer is substantially 100 percent block copolymer and not contaminated with the formation of homopolymer of a second monomer. The formation of the homopolymer of the second block monomer is a possible competing reaction which occurs in other prior art processes such as in Otsu's iniferter prior art mentioned herein.

One method to prepare polymers or copolymers having a narrow molecular weight distribution or polydispersity is by anionic processes. The use and availability of resins having narrow polydispersities in industrial applications is limited primarily since anionic polymerization processes are performed in the absence of atmospheric oxygen and moisture, require difficult to handle and hazardous initiator reagents, and consequently, such polymerization processes are generally limited to small batch reactors. In addition, the monomers and solvents that are used must be of high purity and anhydrous, rendering the anionic process more costly than alternatives which do not have these requirements. Furthermore, not all monomers are compatible with anionic polymerization. It is, therefore, desirable to provide a free radical polymerization process that would provide narrow molecular weight distribution resins without the disadvantages of the aforementioned anionic polymerization processes.

Free radical polymerization processes are chemically less sensitive to impurities present in the monomers or solvents typically used, and are substantially insensitive to water. There has been a need for improved economical free radical polymerization process which is suitable for preparing narrow polydispersity resins by suspension, solution, bulk or neat, emulsion and related processes, and which polymerization process provides resins that can undergo further reaction to provide a number of resins, especially thermoplastic resins.

Copolymers prepared by free radical polymerization processes inherently have broad molecular weight distributions or polydispersities, generally greater than about four, since, for example, free radical initiators have half lives that are relatively long, from several minutes to many hours, and polymeric chains are not all initiated at the same time, and wherein the initiators provide growing chains of various lengths at any time during the polymerization process. Also, the propagating chains in a free radical process can react with each other in processes known as coupling and disproportionation, both of which are chain terminating reactions, thus chains of varying lengths are terminated at different times during the reaction process which results in resins comprised of polymeric chains which vary widely in length from very small to very large. For a free radical polymerization process to be effectively enabled for providing narrow molecular weight distributions, all polymer chains are to be initiated at about the same time and premature termination by coupling or disproportionation processes should be minimized or avoided.

Otsu et. al., in *Makromol Chem., Rapid Commun.*, 3, 127 (1982), discloses the use of iniferters as a means of producing block copolymers by a free radical polymerization process. A mechanism proposed for the reaction suggested that a pseudoliving propagating free radical chain exists, and that it continues to grow with time. There are two primary major drawbacks associated with using iniferters. Iniferters tend to react very slowly and the percent conversion or degree of polymerization of monomer to polymer is low, for example about 40 percent even after 20 hours of reaction time; and the free radical trap that caps the end of the growing chain has the ability to initiate new chains at any time during the course of the reaction, see for example S. R. Turner, R. W. Blevins, in *Polymer Reprints*, 29(2), September 1988. This initiation results in new chains being initiated at various times during the polymerization and consequently results in a broadening of the polydispersity. The processes of the aforementioned Otsu et al. reference are not believed to be applicable to the synthesis of narrow molecular weight distribution resins, particularly for polymers with high molecular weights.

The use of stable free radicals is known as inhibitors of free radical polymerizations, see for example G. Moad et al., *Polymer Bulletin* 6, 589 (1982). Studies by, for example, G. Moad et al. *J. Macromol. Sci.-Chem.*, A17(1), 51(1982), have reported on the use of stable free radicals as inhibitors of free radical polymerizations performed at low temperatures, for example below 90° C. Little is known concerning the reaction of stable free radical agents at higher temperatures and at high monomer to polymer conversions.

In a hypothetical free radical polymerization of styrene in which chains are continually initiated over the course of the polymerization, and where chain termination by coupling processes is also occurring, calculations as described in, for example, G. Odian, *Principles of Polymerization*, pages 280 to 281, 2nd Ed., John Wiley & Sons, 1981, have shown that the narrowest polydispersity that one can theoretically obtain is 1.5. In practice, polydispersities much greater than 1.5 are actually obtained. Wide polydispersities of between 2.0 and 2.4 are typical for free radical homopolymerizations of styrene. With copolymer systems, polydispersities of greater than 4 are generally obtained. The stable free radical polymerization processes of the instant invention enable narrow polydispersities of between about 1.05 to about 2, and specifically about 1.1 to about 1.3 for polystyrene, and as low as 1.5 for various copolymer styrene acrylates. Also, the stable free radical polymerization systems of the present invention permit polydispersities that are comparable to those obtained in anionic polymerizations.

U.S. Pat. No. 4,581,429 to Solomon et al. discloses a free radical polymerization process which controls the growth of polymer chains to provide primarily short chain or oligomeric homopolymers and copolymers including block and graft copolymers. The process employs an initiator reaction product having the formula (in part)=N-O-X, where X is a free radical species capable of polymerizing unsaturated monomers. The molecular weights of the polymer products obtained are generally, for example, from about 2,500 to about 7,000 with polydispersities generally of about 1.4 to about 1.8 at low monomer to polymer conversion. The reactions typically have low conversion rates. Reference to the working Examples of this patent indicate temperatures of less than 100° C., one $M_w/M_n$ ratio of apparently 1.15 (if the polymerization was allowed to continue similar to the other Examples it is believed that the polydispersity would probably broaden and be greater than 1.15), wherein the $M_n$ was 3,200 and the conversion was low, 1.4 to 1.8, and wherein the calculated nonreported conversion rates are low, for example 22 percent or lower. With the aforementioned processes, it is believed that thermoplastic polymers were not obtained. In Example 23 where there was an attempt to increase the degree of polymerization up to n=70, the temperature was increased to 120° C. for 1.5 hours and there resulted a low molecular weight polymer of $M_n$=6,700 and a broad polydispersity of 1.82. In Example 25, there was employed additional heating at 140° C. for 2 hours to increase the degree of polymerization up to 22 which is still low and not in the region for the material to be considered a polymer. No molecular weight data was given in Example 25. Also, in Example 29 the mixture was heated to 120° C. for 0.5 hour and n was only 11.

In U.S. Pat. No. 5,322,912, the disclosure of which is totally incorporated herein by reference, there is illustrated a free radical polymerization process for the preparation of a thermoplastic resin or resins comprising:

heating a mixture of a free radical initiator, a stable free radical agent, and at least one polymerizable monomer compound to form the thermoplastic resin or resins with a high monomer to polymer conversion;

cooling the mixture;

isolating the thermoplastic resin or resins; and washing and drying the thermoplastic resin or resins, and more specifically, a free radical polymerization process for the preparation of a thermoplastic resin or thermoplastic resins comprising:

heating at a temperature of at least 100° C., and in embodiments from about 120° to about 160° C., a mixture of a free radical initiator, a stable free radical agent, and at least one polymerizable monomer to form the thermoplastic resin or thermoplastic resins with a high monomer to resin or resins conversion of at least about 50 percent and with polydispersity of from about 1.05 to about 1.95; and cooling the mixture. By employing ultrasonic irradiation to the above free radical polymerization process, the temperature of polymerization can be lowered from about 120° to about 160° C. to about 40° to about 100° C. The length of polymerization time to obtain high conversion of monomer to polymer can be decreased from about greater than 20 hours to about 3 to about 7 hours depending on temperature, volume and scale of the reaction.

U.S. Pat. No. 5,059,657 discloses a polymerization process for acrylic and maleimide monomers by contacting the monomers with a diazoxate, cyanate or hyponitrite, and N-chlorosuccinimide, N-bromosuccinimide or a diazonium salt. The polymer produced can initiate further polymerization, including use in block copolymer formation.

U.S. Pat. No. 5,312,871 discloses a radical polymerization process for the preparation of narrow molecular weight distribution polymers which involves polymerizing a vinyl monomer or monomers with an initiator or initiating system comprising an alkyl or aryl metal, a strongly binding monodentate, bidentate or polydentate ligand and a stable oxy free radical. The initiating system of U.S. Pat. No. 5,312,871 is considered complex, consisting of three components, an alkyl or aryl metal and a binding ligand (monodentate, bidentate or polydentate material), plus the stable oxy free radical. Examples of the alkyl or aryl metal are triisobutyl aluminum, diisobutyl aluminum hydride, dichloro ethyl aluminum, diethyl zinc, butyl lithium and phenyl magnesium bromide. Examples of the binding ligands are triphenyiphosphine, bipyridyl, dimethylglyoxime and porphyrin. Examples of stable oxy free radical are TEMPO and galvinoxyl The polymerization process is typically performed in a solvent media, such as benzene, toluene or hexane, at temperatures in the range of 0° C. to 100° C.

In free radical polymerization reaction processes of the above prior art, with the primary exception of U.S. Pat. No. 5,322,912, and similar stable free radical polymerization processes wherein a stable free radical agent is selected, various significant problems are believed to exist, for example difficulties in predicting or controlling the polydispersity and modality of the polymers produced. These free radical polymerization processes usually provide polymers with high weight average molecular weights ($M_w$) and low number average molecular weights ($M_n$) resulting in broad polydispersities or oligomers. Further, bulk or neat free radical polymerization processes are prone to generating excessive quantities of heat since the polymerization reaction is exothermic and as the viscosity of the reaction medium increases, dissipation of heat becomes more difficult. This is referred to as the Trommsdorff effect as discussed and illustrated in *Principles of Polymerization*, G. Odian, 2nd Ed., Wiley-Interscience, N.Y., 1981, page 272, the disclosure of which is entirely incorporated herein by reference. Moreover, the exothermic nature of free radical polymerization processes is often a limitation that severely restricts the concentration of reactants or the reactor size upon scale up.

Additionally, gel body formation in conventional free radical polymerization processes may result in a broad molecular weight distribution and/or difficulties encountered during filtering, drying and manipulating the product resin. These and other disadvantages are avoided, or minimized with the processes of the present invention.

It is known to form resins by bead suspension polymerization, reference, for example, U.S. Pat. Nos. 4,601,968 and 4,609,607, the disclosures of which are totally incorporated herein by reference.

Illustrated in U.S. Pat. No. 5,274,057, the disclosure of which is totally incorporated herein by reference, is that free radical suspension polymerization reactions may also lead to undesirable deposits of polymer on the agitator, baffles, heating coils and reactor walls. In some situations, the suspension coalesces during the reaction producing large deposits of undesirable polymeric gel material which is difficult, expensive and hazardous to remove from the reactor.

The disclosures of the above mentioned patents, publications, and copending applications are incorporated herein by reference in their entirety.

Thus, there remains a need for processes for the preparation of narrow polydispersity polymeric resins, or polymers, and which polydispersity is consistently achieved by economical and scalable free radical polymerization techniques, and which polymers retain many or all of their desirable physical properties, for example hardness, low gel content, processability, clarity, high gloss durability, and the like, while avoiding the problems of gel formation, exotherms, volume limited and multistage reaction systems, purification, performance properties of the polymer resin products, and the like associated with prior art free radical polymerization processes, and wherein the polymerization can be accomplished at low temperatures, such as from about 50° to about 95° C. Also, with the processes of the present invention low temperatures may be selected and the rate of polymerization can be increased, and moreover, free radical components, such as benzoyl peroxide, can be avoided. Moreover, with the present invention free radical components and their undesirable adverse side reactions are avoided.

The polymer, or thermoplastic resin products of the present invention can be selected for a number of uses, such as toners, developers, and more specifically, as toner resins for electrophotographic imaging processes or wherein monomodal or mixtures of monomodal narrow molecular weight resins or block copolymers with narrow molecular weight distribution within each block component are suitable such as in thermoplastic films and coating technologies.

SUMMARY OF THE INVENTION

Examples of objects of the present invention include:

An object of the present invention is to provide processes and polymers that overcome many of the problems and disadvantages of the prior art.

Another object of the present invention is to provide a free radical polymerization reaction system which affords on a consistent basis narrow polydispersity homopolymeric or copolymeric thermoplastic resin products with photoinitiation by UV light, and wherein low temperatures, such as from about −40° C. to 110° C., or about 20° to about 60° C., and preferably in embodiments about 25° C., can be selected, and wherein in embodiments photoinitiator components are selected.

Another object of the present invention is to provide a free radical polymerization reaction system which affords narrow polydispersity, for example about 1.8 or less, homopolymeric or copolymeric thermoplastic resin products, and wherein the rate of polymerization is increased so that the required time to polymerize the monomer to polymer is diminished.

In another object of the present invention there is provided a free radical polymerization reaction system which may be conducted in the presence or absence of conventional reaction media.

Further, in another object of the present invention there are provided living stable free radical polymerization processes utilizing light for initiation, thereby avoiding the use of free radical components like benzoyl peroxide, and wherein homopolymers and block copolymers can be generated.

In yet another object of the present invention, coupling or disproportionation termination reactions are prevented by reversibly terminating the propagating free radical chains with a stable free radical agent which serves to moderate the free radical polymerization process.

In another object of the present invention there is provided the acceleration of the dissociation of the free radical peroxide initiator by the addition of promoter compounds which include, for example, tertiary amines, which ensure that all polymeric chains are initiated nearly simultaneously or about the same time, and wherein low temperatures can be selected.

In another object of the present invention there can be selected the addition of small amounts of organic acids in a molar ratio of stable free radical to organic acids in the range of about 100:1 to about 1:1 and preferably in the range of about 20:1 to about 5:1, which acids include, for example, sulfonic, phosphoric or carboxylic acids like benzoic acid, or camphor sulfonic acid; and a nitroxide stable radical that contains an acidic functional group, such as 2,2,5,5-tetramethyl-3-carboxyl-1-pyrrolidinyloxy, to increase the rate of reaction by at least three times without broadening the polydispersity of the polymeric resins.

Still another object of the present invention is to prepare thermoplastic resins by single pot processes employing a monomer or monomers, a suitable azo or peroxide free radical initiator, and a stable free radical agent.

Another object of the present invention is to prepare resins using polymerization processes wherein the molecular weight of the growing homopolymer or copolymer chains increase over the entire time period of the polymerization reaction, and wherein the percent conversion or degree of polymerization of monomer to polymer with respect to time or number average molecular weight is approximately linear, that is polymerization processes which occur without the aforementioned Trommsdorff-effect.

In objects of the present invention there are provided photoinitiation processes for the preparation of resins with a $M_w/M_n$ ratio of from about 1.05 to about 1.95, and preferably from about 1.1 to about 1.6 at low temperatures, and wherein a high conversion of monomer to polymer is enabled, for example at least 50 percent and from about 50 to about 100, or 50 to 95 percent.

Additionally, in another object of the present invention there are provided stable free radical polymerization processes for obtaining homopolymers, such as homopolymers of styrene, random copolymers, block copolymers, multiblock copolymers, and the like, such as specifically styrene acrylates, styrene methacrylates, styrene butadienes, and generally A, AA, AB, BA, AAA, ABA, BAB, AABBAB, ABC, homopolymers and copolymers can be obtained with the processes of the present invention in various embodiments thereof.

These and other objects of the present invention can be accomplished in embodiments by a free radical polymerization process effected by photoinitiation at low temperatures. More specifically, the processes of the present invention comprise a free radical polymerization process comprising heating at low temperature and in the presence of ultraviolet light, a mixture of a stable free radical agent, and at least one, for example from one to about 5 and in embodiments preferably one, polymerizable monomer compound to form a polymer with a high monomer to polymer conversion; cooling the mixture, optionally isolating the polymer product, and optionally washing and drying the polymer product, and wherein the polymer consistently possesses a narrow polydispersity of, for example, from about 1.05 to about 1.95, and preferably from about 1.1 to about 1.6.

Embodiments of the present invention are directed to a free radical photoinitiating polymerization process for the preparation of polymeric thermoplastic resins comprising heating at from about a minus (−)40° to about 110° C. in the presence of UV light a mixture comprised of a monomer, such as styrene, and a stable free radical agent, and thereafter, effecting polymer propagation by a second heating at a temperature of from about 100° C., and preferably from about 120°, to about 160° C., followed by cooling. Photoinitiator components, or a photoinitiator component can be selected for the processes of the present invention, and are usually added to the reaction mixture prior to heating in the presence of UV light.

Embodiments of the present invention are directed to a free radical photoinitiating polymerization process for the preparation of polymeric thermoplastic polymers, or resins comprising a first heating at from about −40° to about 110° C. in the presence of UV light, a first mixture comprised of a stable free radical agent, and at least one polymerizable monomer compound to form a first intermediate product resin; optionally cooling the first mixture; adding to the first intermediate product resin a second mixture comprised of a stable free radical agent, and at least one polymerizable monomer compound, wherein the polymerizable monomer or monomers of the second mixture is the same as the polymerizable monomer or monomers of the first mixture, and the stable free radical agent of the second mixture is the same or different from the stable free radical agent of the first mixture to form a combined mixture; followed by a second heating of the combined mixture at an effective temperature at from about 100° C. to about 160° C. to accomplish polymerization to form a third mixture comprised of a mixture of thermoplastic resins comprised of a first product resin formed from the first intermediate product resin and added the second monomer or monomers and a second product resin formed from the second monomer or monomers; cooling the third mixture; optionally isolating the mixture of thermoplastic product resins from the third mixture; and optionally washing and drying the mixture of thermoplastic resins, and wherein the first product resin and the second product resin each possess a narrow polydispersity, and the mixture of thermoplastic resins possesses a modality equal to about 1 to about 2. Higher modalities, for example, of from about 3 to about 20 may be conveniently achieved if desired by the subsequent addition of effective amounts of fresh, or new mixtures of monomer or monomers, free radical initiator and stable free radical agent prior to a final cooling and isolation step.

Further, in embodiments of the present invention there is provided a free radical polymerization process for the preparation of a block copolymer thermoplastic resin or resins comprising heating at a temperature of about −40° C. to 110° C., preferably from about 20° to about 60° C., and more preferably at room temperature, for example about 25° C. and in the presence of UV light a first mixture comprised of a stable free radical agent, a photoinitiator component, and at least one polymerizable monomer compound to form a first intermediate product resin; cooling the first mixture; isolating the first intermediate product resin; adding to the first intermediate product resin a second mixture comprised of at least one (when preparing a block copolymer there is usually added one monomer at a time, followed by polymerization at a temperature of from about 100° to about 160° C., then the addition of the next monomer; thus, the number of steps or times different monomers can be added is numerous but each time only one monomer is added) polymerizable monomer compound, wherein the polymerizable monomer compound of the second mixture is different from the polymerizable monomer compound of the first mixture to form a combined mixture; heating the combined mixture to form a third mixture comprised of a block copolymer thermoplastic resin comprised of a first product resin formed from the first intermediate product resin and added the second monomer, cooling the third mixture; optionally isolating the block copolymer thermoplastic resin from the third mixture; and optionally washing and drying the block copolymer thermoplastic resin, and wherein the block copolymer possesses a narrow polydispersity and a modality equal to 1. The isolation of the intermediate product resin is preferred when highest purity and block integrity or homogeneity is desired, that is, residual unreacted monomer or monomers of the first mixture may subsequently react with and be integrated into the growing polymer chain formed from the second mixture of polymerizable monomer compounds. Thus, in preparing block copolymers by processes of the instant invention isolation by, for example, precipitation of intermediate products of polymerization reactions is preferred when high purity is desired or when the degree of polymerization is less than about 70 to 90 percent for a block or multiblock polymerization reaction.

The present invention includes the following embodiments a free radical polymerization process for the preparation of thermoplastic resin comprising:

heating a mixture of a stable free radical agent, an optional photoinitiator and at least one polymerizable monomer compound, such as styrene, and wherein said heating is accomplished at a temperature of from about −40° C. to about 110° C. in the presence of ultraviolet light, cooling the mixture;

polymerizing and propagation of polymer chains by heating at a temperature of from about 100° C. to about 160° C.; and isolating the polymer product, such as polystyrene, and washing and drying the polymer, and wherein in embodiments there can be selected as the stable free radical agent 4-oxo-2,2,6,6-tetramethyl-1-piperidinyloxy, (4-oxo-TEMPO), or TEMPO.

The present invention provides in embodiments a pseudo-living polymerization process that enables the synthesis of narrow polydispersity homoacrylate and copolymeric acrylate resins from acrylate and acrylate derivative monomers. In embodiments of the present invention, UV light/free radical agent, such as TEMPO, acts as the initiator and the free radical initiator, such as benzoyl peroxide, is not selected.

In embodiments of the aforementioned processes, polymer or copolymer resin compositions are obtained wherein the product resin or resins has a weight average molecular weight ($M_w$) of from about 2,000 to 300,000, a number average molecular weight ($M_n$) of from about 1,800 to about 153,000 and a polydispersity of about 1.05 to about 1.95, and more specifically, wherein the $M_w/M_n$ is from about 1.1 to about 1.6, from about 1.1 to about 1.5, or from about slightly greater than 1 to about 1.6. Processes of the present invention further comprise in embodiments a means for sequentially repeating the monomer addition or polymerization step, and with additional stable free radical and free radical initiator of the process being added, N times, to provide a well defined mixture of thermoplastic resins wherein each resin in the mixture is comprised of polymers having discrete and narrow polydispersities, and wherein the mixture has a modality equal to N+1 wherein N is the number of times the addition step of initiator and/or excitation by UV light, stable free radical agent and monomer is repeated.

The present invention provides several specific advantages in embodiments as follows.

With the process of the present invention, polymer product polydispersities are consistently narrow, and can be varied from between approximately 1.05 to approximately 1.95 depending, for example, on the monomer/comonomer system, varying the ratio of stable free radical agent to free radical initiator molar concentration, and photoinitiator component. When the polymerization photoinitiator process conditions of the present invention are attempted without UV light, without a photoinitiator, without a SFR (stable free radical agent), broad molecular weight resins with a polydispersity of between 2 and 6 are usually obtained, and the monomer to polymer conversion is low.

The stable free radical agent moderated polymerization reactions may be accomplished in a variety of media, for example suspension, emulsion, bulk, that is neat or without solvent, or in aqueous or nonaqueous solution, using preferably higher boiling solvents, such as toluene and xylene.

During the reaction of monomer or mixed monomers to form polymers, the reaction time may vary, for example about 1 to about 60 hours, preferably between about 2 to 10 hours, and optimally about 4 to 7 hours. The optimal reaction time may vary depending upon the temperature, the volume and scale of the reaction, and the quantity and type of polymerization initiator and stable free radical agent selected. The polymerization reaction temperature is retained relatively constant throughout the heating step by providing an adjustable external heat source, and the temperature is maintained at from about 120° C. to about 160° C. as indicated herein.

In embodiments, in the absence of ultraviolet irradiation, substantially no polymerization results on heating if thermal polymerization is suppressed by a suitable agent such as benzoic acid or a sulfonic acid. However, if this same mixture of monomer and nitroxide is irradiated at temperatures of about −40° C. to about 105° C., then, on subsequent heating to a higher temperature, pseudoliving polymerization does take place. It is believed that a stable free radical agent like TEMPO and other effective nitroxides may not be energetic enough in the ground state to initiate polymerization. However, it is believed that these same nitroxides with UV irradiation can initiate polymerization from an excited state. This type of initiation process can be used with a wide variety of nitroxides and monomers, and the low initiation temperature can consistently provide narrow polydispersities. Also, with the present invention the process thereof may be selected as an alternative to thermal initiation in a continuous process where additives to inhibit thermal polymerization are present. Furthermore the invention process can be used without reagents or reactants which are sensitive to free radical initiators such as benzoyl peroxide and the like. Processes of the present invention in embodiments provide for high monomer to polymer conversion rates, or degrees of polymerization, for example, of 90 percent by weight or greater and, more specifically, from about 75 to about 100 percent in embodiments. Further, the processes of the present invention in embodiments provide for relatively high weight average molecular weights of the polymer product, with weight average molecular weights ranging from about 2,000 to about 300,000 and preferred ranges of from about 2,000 to about 250,000. In embodiments with the process of the present invention, polymers with $M_w$ of about 500,000 can be obtained.

Examples of stable free radical agents, or components that can be selected include nitroxide free radicals like, for example, proxyl (2,2,5,5-tetramethyl-1-pyrrolidinyloxy), 3-carboxyl-proxyl, 3-carbamoyl-proxyl, 2,2-dimethyl-4,5-cyclohexyl-proxyl, 3-oxo-proxyl, 3-hydroxylimine-proxyl, 3-aminomethyl-proxyl, 3-methoxy-proxyl, 3-t-butyl-proxyl, 3-maleimido-proxyl, 3,4-di-t-butyl-proxyl, 3-carboxylic-2,2,5,5-tetramethyl-1pyrrolidinyloxy and the like, and derivatives thereof, and TEMPO (2,2,6,6-tetramethyl-1-piperidinyloxy), 4-benzoxyloxy-TEMPO, 4-methoxy-TEMPO, 4-carboxylic-4-amino-TEMPO, 4-chloro-TEMPO, 4 hydroxylimine-TEMPO, 4-hydroxy-TEMPO, 4-oxo-TEMPO, 4-oxo-TEMPO-ethylene ketal, 4-amino-TEMPO, 2,2,6,6-tetraethyl-1-piperidinyloxy, 2,2,6-trimethyl-6-ethyl 1-piperidinyloxy and the like, and derivatives thereof, and dialkyl nitroxide radicals such as di-t-butyl nitroxide, diphenyl nitroxide, t-butyl-t-amyl nitroxide and the like, and derivatives thereof, and DOXYL (4,4-dimethyl-1-oxazolidinyloxy), 2-di-t-butyl-doxyl, 5-decane-doxyl, 2-cyclohexane-doxyl, and the like, and derivatives thereof, and 2,5-dimethyl-3,4-dicarboxylic-pyrrole, 2,5-dimethyl-3,4-diethylester-pyrrole, 2,3,4,5-tetraphenyl-pyrrole and the like, and 3-cyano-pyrroline-3-carbamoyl-pyrroline, 3-carboxylic-pyrroline and the like, 1,1,3,3-tetramethylisoindoline-2-yloxyl and 1,1,3,3-tetraethylisoindolin-2-yloxyl and the like; porphyrexide nitroxyl radicals such as 5-cyclohexyl porphyrexide nitroxyl and 2,2,4,5,5-pentamethyl-Δ3-imidazoline-3-oxide-1-oxyl and the like, and galvinoxyl and the like; 1,3,3-trimethyl-2-azabicyclo[2,2,2]octane-5-one-2-oxide and 1-azabicyclo[3,3,1]nonane-2-oxide and the like; and with TEMPO being preferred.

The monomers selected include those capable of undergoing a free radical polymerization, and include, but are not limited to styrene, substituted styrenes and derivatives thereof, for example α-methylstyrene, 4-methylstyrene, butadiene and any conjugated diene monomer sufficiently reactive under the specified stable free radical moderated polymerization reaction conditions to afford a stable free radical reaction adduct and high molecular weight polymer product, for example isoprene and myrcene, acrylates, and derivatives thereof. Examples of polymers obtained include polymers of styrenes, acrylates, styrene/acrylates, styrene/butadienes, and the like. The acrylate polymerization of the present invention reactions can in embodiments be supplemented with a solvent or cosolvent to help ensure that the reaction mixture remains a homogeneous single phase throughout the monomer conversion. Any solvent or cosolvent may be selected providing that the solvent media is effective in permitting a solvent system which avoids precipitation or phase separation of the reactants or polymer products until after all polymerization reactions have been completed. Exemplary solvent or cosolvent includes polymer product compatible aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives, such as butyl CARBITOL® or CELLOSOLVE®, amino alcohols, ketones, and the like, derivatives thereof, and mixtures thereof. Specific solvent examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

The polymerization reaction rate of the monomers may in embodiments be accelerated and the reaction time reduced to about 4 to 7 hours from greater than 16 hours by the addition of a catalytic amount of a protic acid that will not also initiate cationic polymerization, and which acid is selected from the group consisting of organic acids such as sulfonic, phosphoric, carboxylic acids and nitroxides containing acid functional groups, such as 3-carboxyl-proxyl, and wherein camphor sulfonic acid is a preferred acid. The molar ratio of stable free radical to acid can vary, and for example, can be from about 100:1 to 1:1 with a preferred ratio of between about 20:1 and 5:1. Excessive addition of organic acid beyond the aforementioned amounts may in embodiments cause the resin polydispersity to broaden.

The stable free radical moderated polymerization process of the present invention may be repeated a number of times within the same reaction vessel by the delayed and stepwise addition of more monomer or monomers with varying amounts of photoinitiator and stable free radical agent to form a mixture of monomodal resins where each component has a distinct molecular weight and has a narrow molecular weight distribution, and wherein the mixture has a modality of N+1, where N represents the number of additional times that monomer, initiator and stable free radical agent are added.

By cooling, which can be accomplished by terminating the heating source, such as an oil bath, and removing the vessel from the oil bath and permitting it to cool on its own while maintaining stirring, the polymerization reaction attains ambient temperature and the stable free radical moderated reaction is effectively quenched or terminated. Each new or subsequent addition of monomer, stable free radical and photoinitiator accompanied by heating with UV provides a new polymeric species having a narrow molecular weight distribution, and each new polymer species continues to grow independent of the other polymer species previously formed.

Alternatively, block copolymer resins may also be prepared whereby after each desired block has been formed a new monomer or monomers is added without the addition of more initiator or stable free radical agent to form a new block wherein each block component is well defined in length and has a narrow molecular weight distribution, and having properties depending on the repeated sequence and the monomers chosen for incorporation.

Additional optional known additives may be selected in the polymerization reactions, and which additives may provide performance enhancements to the resulting product, for example colorants, lubricants, release or transfer agents, surfactants, stabilizers, antifoams, and the like.

Polymer resins possessing discrete mixture of monomodal, that is a well defined multimodal molecular weight distribution, may in embodiments thereof provide several advantages, particularly for electrophotographic toner compositions, such as melt rheology properties including improved flow and elasticity, and improved performance properties such as triboelectrification, admix rates and shelf life stabilities.

The processes of the present invention can be selected to form a wide variety of polymers. For example, the invention processes can be selected to polymerize a styrene monomer to form polystyrene, butadiene to form polybutadiene, or n-butyl acrylate to form poly(n-butyl acrylate). The process of the present invention, can be selected to polymerize a mixture of two or more different polymerizable monomers to form copolymers therefrom, for example polymerization of styrene and butadiene to form poly(styrene butadiene), styrene and isoprene to form poly(styrene-isoprene), styrene and ethyl acrylate to form poly(styrene-ethylacrylate), and the like, and combinations thereof, including copolymers and terpolymers.

A suitable reaction medium employed for conducting processes of the instant invention includes bulk or neat, suspension, emulsion, and solution systems.

In embodiments, there can be incorporated into the monomer reactant selected a waxy component, such as alkylenes like polyethylene, polypropylene waxes, and mixtures thereof, having a low molecular weight of from between about 1,000 to about 20,000. The use of such a component may be desirable for certain toner applications. Suitable low molecular weight waxes, such as polyethylene and polypropylene, are disclosed in U.S. Pat. No. 4,659,641, the disclosure of which is totally incorporated herein by reference.

Examples of photoinitiators selected in various effective amounts, such as from about 1 to about 10 weight percent based on the total weight percent of reactants, include benzoins, disulfides, aralkyl ketones, oximinoketones, peroxyketones, acyl phosphine oxides, diamino ketones, such as Micher's ketones, 3-keto courmarins, and the like, and preferably 1-hydroxycyclohexyl phenyl ketone.

Toner compositions can be prepared by a number of known methods, such as by admixing and heating the polymer, or resin obtained with the processes of the present invention, such as styrene, styrene copolymers, styrene-butadiene copolymers, and the like, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Thereafter, the toner compositions can be classified utilizing, for example, a Donaldson Model B classifier for the purpose of removing toner fines, that is toner particles less than about 4 microns volume median diameter.

Illustrative examples of suitable toner polymers obtained with the processes of the present invention that can be selected for toner and developer compositions in effective amounts of, for example, from about 75 to about 98 weight percent include styrenes, styrene/acrylates, styrene/butadienes, vinyl resins, including homopolymers and copolymers of two or more vinyl monomers; vinyl monomers including styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, 2-ethylhexyl acrylate, n-octyl acrylate, phenyl acrylate, acrylonitrile, methacrylonitrile, acrylamide, and the like. Preferred toner resins include styrene-butadiene copolymers, mixtures thereof, and the like. Preferred toner polymers include styrene polymers, styrene/acrylate copolymers, PLIOLITES®, and suspension polymerized styrene-butadienes, reference U.S. Pat. No. 4,558,108, the disclosure of which is totally incorporated herein by reference.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K. K., and similar waxes. The commercially available polyethylenes selected possess a molecular weight $M_n$ of from about 1,000 to about 1,500, and the commercially available polypropylenes utilized for the toner compositions are believed to have a molecular weight of from about 4,000 to about 7,000. Examples of polyethylene and polypropylene compositions are illustrated in British Patent 1,442,835, the disclosure of which is totally incorporated herein by reference.

The low molecular weight wax materials are present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight, and may in embodiments function as fuser roll release agents.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxysilane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 70 to about 175 microns thereby permitting them to possess sufficient density and inertia to avoid adherence to the electrostatic images during the development process. The carrier component can be mixed with the toner composition in various suitable combinations, however, best results are obtained when about 1 to about 5 parts per toner to about 10 parts to about 200 parts by weight of carrier are selected.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys. Flexible layered imaging members with charge transport and photogenerating layers can be selected for the imaging and printing processes.

The following Examples are provided. Parts and percentages are by weight unless otherwise indicated.

EXAMPLE I

Preparation of a Living Prepolymer by Photolysis:

Sodium styrene sulfonate (2.607 grams) and TEMPO (3.198 grams) were dissolved in water/methanol (30 milliliters/30 milliliters—no deoxygenation) and subjected to UV irradiation. The light source used was a high pressure 450 W Hanovia mercury vapor lamp, which was placed in a water cooled, quartz, immersion well (Ace Glass Company). The immersion well was placed in a 2 liter beaker containing water and the reaction sample containing the reagents in methanol/water was placed in the beaker in a long glass Craig Tube. After 4 hours 45 minutes irradiation, 15 milliliters of sample was withdrawn and placed in a separatory funnel and extracted with diethyl ether (2×15 milliliters) to remove the excess TEMPO and the aqueous residue (7.3 grams) was used in the next step.

Living Polymerization:

The above aqueous prepolymer residue (7.3 grams) was added to sodium styrene sulfonate (15 grams), ethylene glycol (28 grams) and water (12 grams), and heated to 110° C. for 7 hours and 40 minutes. During this time, four aliquots were removed and the GPCs of these aliquots were plotted. The plots evidenced that the polymerization was living and that the styrene sulfonate product was free of any traces of dead polymer. With other initiating systems dead polymer was usually formed during the initial stages of the reaction. The four samples possessed the following measured characteristics: BK7026-78R20 possessed a $M_n$ of 11,211, a $M_w$ of 16,671, a MP of 15,402, and a polydispersity of 1.487; BK7026-77R20 possessed a $M_n$ of 14,946, a $M_w$ of 21,775, a MP of 19,518, and a polydispersity of 1.456; BK7026-78BR120 possessed a $M_n$ of 19,174, a $M_w$ of 26,614, a MP of 23,395, and a polydispersity of 1.388; and BK7026-78R240 possessed a $M_n$ of 25,319, a $M_w$ of 34,201, a MP of 30,614, and a polydispersity of 1.351.

Chain Extension:

The reaction mixture from the above first polymerization was added to methanol/acetone (75 milliliters/75 milliliters) and the resulting precipitate was slurried with acetone. Chain extension was conducted as above but the reaction was now much more rapid because all remaining excess TEMPO had been removed. A very high molecular weight, about 100,000 $M_w$, was achieved indicating that chain extension was taking place.

The above was repeated with the exception that the photoinitiator 1-hydroxycyclohexyl phenyl ketone, 1.06 grams, was added to the reaction mixture prior to the UV irradiation, and substantially similar results were achieved.

Also, the above process can be repeated wherein the UV photoinitiation is at a low temperature of about 25° C.

followed by a second heating primarily for polymer propagation at a higher temperature of about 130° C. and wherein a polymer, such a styrene, a styrene sulfonate, and the like with an excellent polydispersity of about 1.17, is believed obtainable.

Xerographic latent images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference, with toner compositions prepared from the polymers products, such as a styrene copolymer and REGAL 330® carbon black, 8 weight percent, and which images are expected to be of excellent quality with no background deposits and of high resolution over an extended number of imaging cycles exceeding, it is believed, about 75,000 imaging cycles.

Other toner compositions may be readily prepared by conventional means from the polymer and copolymer resins obtained with the processes of the present invention including colored toners, single component toners, multicomponent toners, toners containing known additives, and the like.

The aforementioned invention stable free radical agent moderated polymerization process may be applied to a wide range of organic monomers to provide toner polymer materials with desirable electrophotographic properties, coatings, and the like. For example, the polymer product can be selected as dispersants for photoreceptor pigments. The multimodal polymer resin products can be utilized for low melting toner resins and certain monomodal resins may be used to modify the surface of carbon black and other pigment particles to render the pigment particles more miscible with a host polymer or dispersing medium. Moreover, narrow (PD) molecular weight resins, such as poly(styrene-butadiene), can be selected as toner resins for reprographic applications.

Other modifications of the present invention may occur to those of ordinary skill in the art based upon a review of the present application and these modifications, including equivalents thereof, are intended to be included within the scope of the present invention.

What is claimed is:

1. A free radical polymerization process for the preparation of polymer having a narrow polydispersity from about 1.05 to about 1.95 comprising;

photoinitiating with ultraviolet (UV) light in the presence of a first heating of a mixture comprised of a stable free radical agent, and at least one polymerizable monomer compound, and wherein said first heating is at a temperature of from about a −40° C. to about 110° C.;

cooling said mixture;

a second heating of said mixture at a temperature of from about 100° C. to about 160° C.;

isolating the polymer product formed; and optionally washing and drying said polymer.

2. A process in accordance with claim 1 wherein said first heating is at a temperature of from about a minus 20° C. to about 60° C.

3. A process in accordance with claim 2 wherein said second heating is at a temperature of from about 120° C. about 160° C.

4. A process in accordance with claim 2 wherein the resin product is isolated by precipitation in a nonsolvent, followed by filtration.

5. A process in accordance with claim 1 wherein said first heating is at a temperature of about 25° C.

6. A process in accordance with claim 1 wherein said second heating is at a temperature of from about 120° C. about 160° C.

7. A process in accordance with claim 1 wherein said at least one polymerizable monomer compound is from 1 polymerizable monomer compound to about 5 different kinds of polymerizable monomer compounds.

8. A process in accordance with claim 1 wherein said polymerizable monomer is styrene.

9. A process in accordance with claim 1 further including adding a photoinitiator component prior to or during said first heating.

10. A process in accordance with claim 9 wherein said photoinitiator component is selected from the group consisting of benzoin, disulfide, aralkyl ketone, oximinoketone, peroxy ketone, acyl phosphine oxide, and diamino ketone.

11. A process in accordance with claim 9 wherein said photoinitiator component is 1-hydroxycyclohexyl phenyl ketone.

12. A process in accordance with claim 1 further including adding a photoinitiator component prior to said first heating.

13. A process in accordance with claim 12 wherein the stable free radical agent is comprised of a nitroxide stable free radical selected from the group consisting of 2,2,5,5-tetramethyl-1-pyrrolidinyloxy, 2,2,6,6-tetramethyl-1-piperidinyloxy, 4,4-dimethyl-1-oxazolidinyloxy, and N,N-dialkyl nitroxides.

14. A process in accordance with claim 12 wherein the stable free radical agent is 2,2,6,6-tetramethyl-1-piperidinyloxy.

15. A process in accordance with claim 1 wherein said polymer product is polystyrene, or a polystyrene sulfonate.

16. A free radical polymerization process in accordance with claim 1 wherein the product possesses a narrow polydispersity and is obtained in excellent conversion, which conversion is from about 50 to about 95 percent, which polydispersity is from about 1.1 to about 1.8, and photoinitiation is accomplished with UV light in the presence of a photoinitiator component.

17. A process in accordance with claim 1 wherein the heating at a temperature of from about 100° C. to about 160° C. is conducted as a monomer suspension in water or as a monomer suspension in a polar liquid which is not miscible with said monomer compound.

18. A process in accordance with claim 1 wherein the first heating is accomplished for a period of time of from about 10 minutes to 20 hours.

19. A process in accordance with claim 1 wherein the stable free radical agent is comprised of a nitroxide stable free radical.

20. A process in accordance with claim 1 wherein the stable free radical agent is comprised of nitroxide stable free radicals selected from the group consisting of 2,2,5,5-tetramethyl-1-pyrrolidinyloxy and derivatives thereof, 2,2,6,6-tetramethyl-1-piperidinyloxy and derivatives thereof, 4,4-dimethyl-1-oxazolidinyloxy and derivatives thereof, N,N-dialkyl nitroxides and derivatives thereof, and mixtures thereof.

21. A process in accordance with claim 1 wherein one to three kinds of monomers are employed, and wherein said monomer to polymer conversion is from about 50 to about 95 percent and the polydispersity is from about 1.1 to about 1.6.

22. A process in accordance with claim 1 further comprising adding an organic sulfonic, phosphoric or carboxylic acid during said second heating at from about 100° C. to about 160° C. of said mixture thereby increasing the rate of formation of said polymer, or further comprising adding a tertiary amine promoter compound to said mixture thereby increasing the rate of dissociation of said free radical agent.

23. A process in accordance with claim 1 wherein the photoinitiation with UV light is accomplished at a wavelength of from about 200 to about 400 nanometers.

24. A process in accordance with claim 1 wherein the stable free radical agent is 4-oxo-2,2,6,6-tetramethyl-1-piperidinyloxy, and wherein there is further selected an optional free radical initiator of azobisisobutyronitrile or benzoyl peroxide for said heating, and photoinitiating with ultraviolet light.

25. A process in accordance with claim 1 wherein the first heating is from about 55° C. to about 95° C., the polydispersity is from about 1.1 to about 1.6, and the monomer to polymer conversion is from about 50 to about 95 percent.

26. A process in accordance with claim 1 wherein the polymer product polydispersity is from 1.1 to 1.3.

27. A process in accordance with claim 1 wherein the mixture is cooled to about 25° C.

28. A process in accordance with claim 1 wherein the polymerization of the monomer to the polymer product occurs without a Trommsdorff effect, or without an autopolymerization effect.

29. A free radical polymerization process for the preparation of a copolymer thermoplastic resin or resins having a narrow polydispersity from about 1.05 to about 1.95 comprising:

a first heating and photoinitiating with ultraviolet light of a first mixture comprised of a stable free radical agent, and at least one polymerizable monomer compound to form a first intermediate product resin;

cooling said first mixture;

isolating said first intermediate product resin;

adding to said first intermediate product resin a second mixture comprised of at least one polymerizable monomer compound, wherein said polymerizable monomer compound of said second mixture is different from said polymerizable monomer compound of said first mixture, and wherein there is formed a combined mixture;

heating said combined mixture to form a third mixture comprised of a block copolymer thermoplastic resin comprised of a first product resin formed from said first intermediate product resin and added said second monomer, and wherein said heating is a temperature of from about 100° to about 120° C.;

cooling said third mixture;

isolating said copolymer thermoplastic resin from said third mixture; and optionally washing and drying said copolymer thermoplastic resin.

30. A free radical polymerization process for the preparation of a multiblock copolymer thermoplastic resin comprising:

a first heating at a temperature of from about minus 40° C. to about 110° C., and photoinitiating with ultraviolet light a first mixture comprised of a stable free radical agent, and at least one polymerizable monomer compound to form a first intermediate product resin;

optionally cooling said first mixture;

optionally isolating said first intermediate product resin;

adding to said first intermediate product resin a second mixture comprised of at least one polymerizable monomer compound, wherein said polymerizable monomer compound of said second mixture is dissimilar than said polymerizable monomer compound of said first mixture to form a combined mixture;

heating said combined mixture to form a third mixture comprised of a block copolymer thermoplastic resin comprised of a first product resin formed from said first intermediate product resin and added said second monomer, and wherein said heat is at a temperature of from about 100° C. to about 160° C.;

cooling said third mixture, optionally isolating said third mixture;

sequentially repeating the preceding steps of adding, heating and cooling, N times, to form a fourth mixture containing a multiblock copolymer thermoplastic resin or resins having N+2 blocks, and wherein N is the number of times said sequence is repeated;

optionally isolating said multiblock copolymer thermoplastic resin from said fourth mixture; and optionally washing and drying said multiblock copolymer thermoplastic resin, and wherein said multiblock copolymer thermoplastic resin possesses a narrow polydispersity.

31. A process in accordance with claim 30 wherein the monomer compound for the first mixture is a styrene and the monomer for the second mixture is an acrylate.

32. A process in accordance with claim 30 wherein N is from 1 to about 20, and wherein the mixture multiblock of copolymer thermoplastic resins possesses a modality of from about 2 to about 5.

33. A process in accordance with claim 30 wherein the multiblock copolymer thermoplastic resin product has a polydispersity of at least 1.8.

34. A process in accordance with claim 30 wherein the multiblock copolymer thermoplastic resin product has a polydispersity of from about 1.8 to about 4.

35. A free radical polymerization process for the preparation of a polymer comprising:

photoinitiating with ultraviolet light in the presence of a first heating in the presence of a photoinitiator component of a mixture comprised of a stable free radical agent and one polymerizable monomer, and wherein said first heating is at a low temperature of from about 20° C. to about 60° C.;

cooling said mixture;

a second heating of said mixture at a temperature of from about 120° C. to about 160° C.;

isolating the polymer product formed; and washing and drying said polymer.

36. A process in accordance with claim 35 wherein the photoinitiating with ultraviolet light is accomplished at a wavelength of from about 200 to about 400 nanometers.

37. A free radical polymerization process for the preparation of a polymer consisting essentially of a first heating In the presence of ultraviolet light of a mixture of a stable free radical agent and one polymerizable monomer, and wherein said first heating is at a temperature of from about a −40° C. to about 110° C.;

cooling said mixture;

accomplishing a second heating of said mixture at a temperature of from about 100° C. to about 160° C.; and isolating the polymer product formed.

\* \* \* \* \*